United States Patent [19]

Higuchi et al.

[11] Patent Number: 5,434,620
[45] Date of Patent: Jul. 18, 1995

[54] IMAGE SENSOR

[75] Inventors: Hirofumi Higuchi, Aichi; Yasuaki Makino, Okazaki, both of Japan

[73] Assignee: Nippondenso Co., Ltd., Kariya, Japan

[21] Appl. No.: 127,475

[22] Filed: Sep. 28, 1993

Related U.S. Application Data

[63] Continuation of Ser. No. 838,671, Feb. 21, 1992, abandoned.

[30] Foreign Application Priority Data

Feb. 22, 1991 [JP] Japan ................... 3-028830

[51] Int. Cl.[6] ........................................... H04N 5/335
[52] U.S. Cl. ................................. 348/308; 348/307
[58] Field of Search ................ 358/213.11, 213.17, 358/213.18, 213.19, 213.26, 213.27, 213.29, 213.31; H04N 5/335; 348/294, 295, 300, 301, 302, 308, 307, 303, 304

[56] References Cited

U.S. PATENT DOCUMENTS

| | | | |
|---|---|---|---|
| 4,178,612 | 12/1979 | Dudley et al. | 358/167 |
| 4,242,706 | 12/1980 | McCormack et al. | 358/213 |
| 4,379,232 | 4/1983 | Hopper | 250/332 |
| 4,547,806 | 10/1985 | Herbst et al. | 358/212 |
| 4,797,561 | 1/1989 | Tajiri et al. | 358/213.18 |
| 4,802,012 | 1/1989 | Nobue et al. | 358/213.18 |
| 4,809,075 | 2/1989 | Akimoto et al. | 358/213.18 |
| 4,987,321 | 11/1991 | Toohney | 358/213.15 |
| 5,122,881 | 6/1992 | Nishizawa et al. | 358/212 |
| 5,122,889 | 6/1992 | Nishizawa et al. | 358/212 |

FOREIGN PATENT DOCUMENTS

| | | | |
|---|---|---|---|
| 58-45828 | 12/1976 | Japan | H01L 27/14 |
| 58-83477 | 5/1983 | Japan | 358/213.18 |
| 3-9677 | 1/1991 | Japan | H04N 5/335 |
| 3-10562 | 1/1991 | Japan | H04N 1/028 |

OTHER PUBLICATIONS

Solid–State Imaging Device and Application technology to Camera. Torikepps (Sep. 30, 1988).

Primary Examiner—Joseph Mancuso
Assistant Examiner—Tuan V. Ho
Attorney, Agent, or Firm—Cushman Darby & Cushman

[57] ABSTRACT

An image sensor can reduce fixed pattern noise (FPN) caused by transistors used for reading pixel signals. The image sensor comprises photodiodes $D_1$, $D_2$, ... connected to a precharge line $L_{PR}$ through respective precharge transistors $(Tr1)_1$, $(Tr1)_2$; and pixel amplification transistors $(Tr2)_1$, $(Tr2)_2$, ..., one end thereof being connected to a signal read line $L_{RE}$, the other end thereof being grounded through respective pixel switching transistors $(Tr3)_1$, $(Tr3)_2$, ..., and the gates thereof being connected to respective nodes between the precharge transistors $Tr1$, $(Tr1)_2$, ... and the photodiodes $D_1$, $D_2$, ... According to signals provided by a timing signal generator 3, the pixel switching transistors $(Tr3)_1$, $(Tr3)_2$, ... are sequentially turned ON and OFF one after another. During ON and OFF states of each of the pixel switching transistors, a correlated double sampling circuit provides a difference between values read out of the signal read line $L_{RE}$.

9 Claims, 5 Drawing Sheets

IMAGE SENSOR

This is a continuation of Application Ser. No. 07/838,671, filed on Feb. 21, 1992, which was abandoned upon the filing hereof.

BACKGROUND OF THE INVENTION

1. Field of the Invention

The present invention relates to an image sensor.

2. Description of the Related Art

An image sensor comprises photodiodes arranged on a chip. The photodiodes photoelectrically convert optical information from an object into electric image information signals. These image information signals involve noise such as a fixed pattern noise (hereinafter referred to as the FPN).

The image sensor sequentially converts optical data received by a row of the photodiodes (pixels) into voltage levels. When all of the pixels are uniformly irradiated with light, they provide, in theory, an identical output voltage. In practice, however, the outputs of the pixels differ from one another because of the FPN produced by the image sensor.

The extent of the FPN is about several tens of millivolts, although it is dependent on the magnification factor of an amplifier incorporated in the sensor. Since the amplitude of an actual output signal of the image sensor is about 500 mV to 1 V, the FPN can not be ignored, in particular, in a color image sensor involving many intensity levels.

FIG. 1 shows a conventional image sensor to correct the FPN. This image sensor comprises, for each pixel, a precharge transistor 21, a pixel read transistor 22, a photodiode 23, a pixel amplification transistor 24, and a pixel switching transistor 25. The transistors 21 and 22 and the photodiode 23 are connected in series to a precharge line $L_{PR}$. One terminal of the pixel amplification transistor 24 is connected to a signal read line $L_{RE}$, and the other terminal thereof is grounded through the pixel switching transistor 25. The gate of the pixel amplification transistor 24 is connected to a node between the precharge transistor 21 and the pixel read transistor 22.

FIG. 2, shows a time chart in which pixels to be read of the image sensor are switched from one to another through the pixel switching transistors 25. In a pixel to be read, the precharge transistor 21 is turned ON to charge and initialize the photodiode 23 and set the voltage level of a signal line L1 to be equal to that of the signal read line $L_{RE}$, the pixel amplification transistor 24 carries out impedance conversion on a signal from the photodiode 23. The converted signal is transferred to the signal read line $L_{RE}$.

The FPN is produced by the transistors 21, 22, 24, and 25 provided for each of the pixels because the characteristics of these transistors vary from pixel to pixel. The FPN fluctuates the output signals of the pixels. The cause of the FPN will be explained more precisely.

DC offsets of the pixel amplification transistor 24 and pixel switching transistor 25 differ from pixel to pixel because of fabrication allowance of the transistors, thereby partly causing the FPN. The precharge transistor 21 causes, when it is OFF, charges other than a signal to flow into the gate of the pixel amplification transistor 24 due to Miller capacitance, thereby partly causing the FPN. For the same reason as the image amplification transistor 24, the pixel read transistor 22 also causes part of the FPN to affect a signal reading when the transistor 22 is turned ON.

To remove the FPN, the conventional image sensor of FIG. 1 employs a correlated double sampling (CDS) circuit 26. As shown in FIG. 2, the waveform of an image signal read involves the FPN. To remove this, the CDS circuit 26 operates as follows:

At first, a signal $(\phi_{SW})n$ for activating the pixel switching transistor 25 is set to ON. A signal $\phi_{PR}$ for activating the precharge transistor 21 is changed from ON to OFF, and a signal $(\phi_{PH})n$ for activating the pixel read transistor 22 is changed from OFF to ON. Accordingly, the photodiode 23 and the gate of the pixel amplification transistor 24 are precharged, and a level when the precharge transistor 21 is turned OFF is sampled in response to a rise of a sampling signal $\phi_a$. This level includes, in addition to the precharged level, DC offset noise of the pixel amplification transistor 24 and pixel switching transistor 25 as well as noise produced when the precharge transistor 21 is turned OFF. Thereafter, the pixel read transistor 22 is turned ON, and a level when a signal from the photodiode 23 is read is sampled in response to a rise of a sampling signal $\phi_b$. The level sampled with the signal $\phi_a$ is subtracted from the level sampled with the signal $\phi_b$ to cancel the noise components.

The image sensor having the CDS circuit 26 is effective in removing the FPN to some extent. It leaves, however, an FPN of about 30 mV. The inventors of the present invention have found that the FPN is caused when the pixel read transistor 22 is turned ON. It has been generally understood that noise produced when a transistor is turned ON is relatively small. The inventors of the present invention found, however, that it reaches even to about 30 mV. Since the FPN caused by the pixel read transistor 22 is produced at the same timing as providing an output signal, the CDS circuit 26 is theoretically incapable of removing the noise. Namely, other countermeasures for removing the noise must be taken.

SUMMARY OF THE INVENTION

An object of the present invention is to provide an image sensor that can reduce fixed pattern noise (FPN) caused by transistors used for reading pixels.

To accomplish the object, the present invention provides an image sensor comprising a pixel unit, a shift register, a timing signal generator, and a signal processor. The pixel unit involves many pixels and comprises a photodetector disposed for each of the pixels, a precharge line to which a predetermined voltage is applied, a signal read line, a precharge switching element disposed for each of the pixels between the precharge line and the photodetector, to carry out a switching operation in response to a control signal provided by the shift register, an amplification element disposed for each of the pixels and connected to the signal read line as well as to a node between the photodetector and the precharge switching element, and a pixel switching element disposed for each of the pixels and connected to the amplification element, to carry out a switching operation on the amplification element in response to a control signal from the shift register.

More precisely, the present invention provides an image sensor comprising a photodetector disposed for each pixel and connected, through a precharge switching element, to a precharge line to which a predetermined voltage is applied, an amplification element disposed for each pixel, one end of the amplification element being connected to a signal read line, the other end thereof being grounded through a pixel switching element, and the gate thereof being connected to a node between the precharge switching element and the photodetector, a timing signal generator for sequentially turning ON the precharge switching elements of the pixels one after another with the corresponding pixel switching element being ON, a correlated double sampling circuit for providing a difference between a value read out of the signal read line with the precharge switching element being ON and a value read out of the signal line with the precharge switching element being OFF.

In this way, the present invention omits the pixel read transistor 22 of the conventional image sensor of FIG. 1. The timing signal generator of the present invention turns OFF and ON the precharge switching element according to different timing signals with the pixel switching element being ON, thereby providing different signals to the signal read line. The correlated double sampling circuit of the invention carries out a subtraction process to find a difference between the different signals, to cancel noise.

In this way, the correlated double sampling circuit provides a difference between a value read out of the signal read line with the precharge switching element being closed and a value read out of the signal read line with the precharge switching element being open. As a result, the image sensor of the invention can provide a signal with no noise, without using the conventional pixel read transistor 22 of FIG. 1.

DESCRIPTION OF THE PREFERRED EMBODIMENTS

Figure 1:
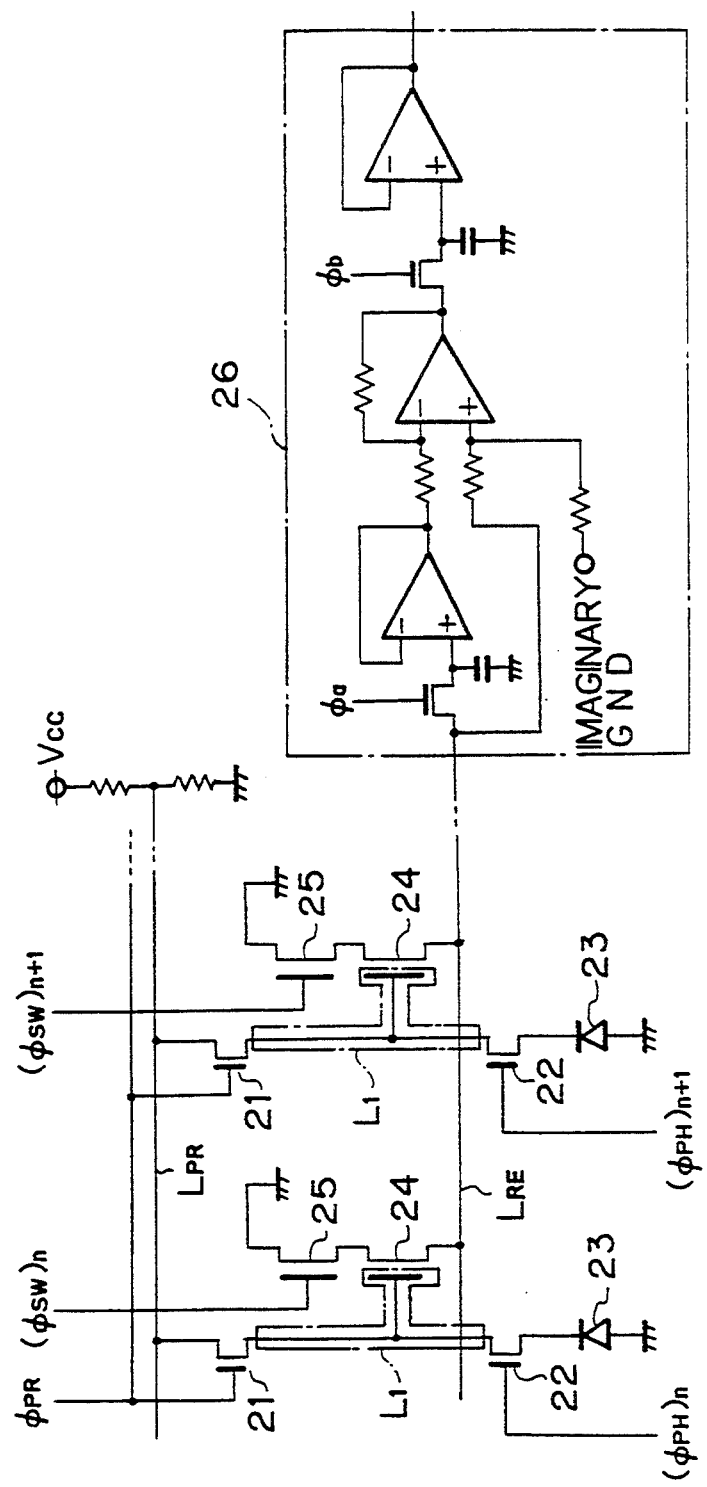
FIG. 1 is a view showing an image sensor according to a prior art.
Figure 2:
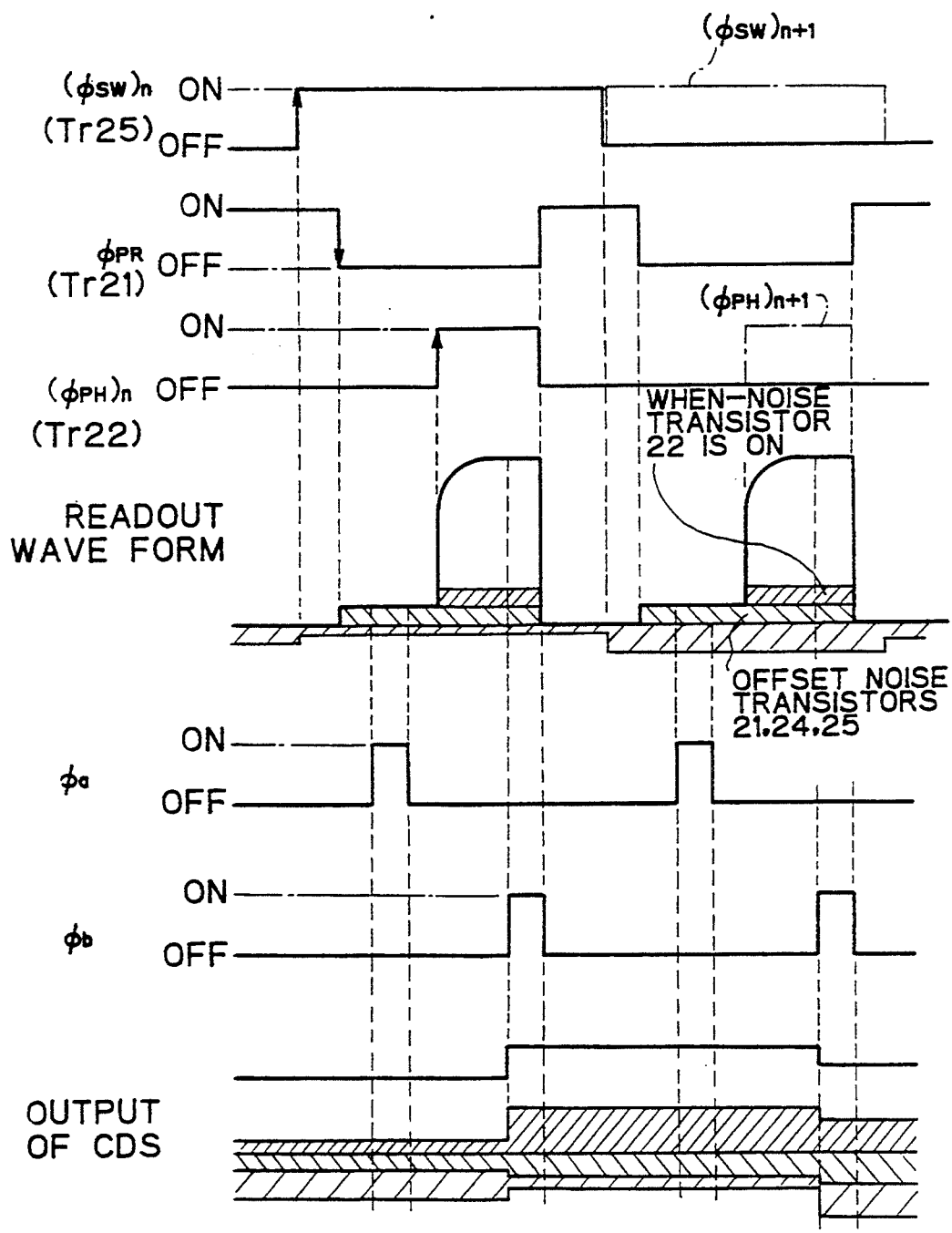
FIG. 2 is a timing chart showing various signals in the image sensor of FIG. 1.

As explained above, it has been conventionally considered that noise can be removed and a signal with no noise can be obtained by sampling a signal involving the noise and a signal involving only the noise out of the signal read line of the circuit of FIG. 1, and by subtracting the noise only signal from the noise involving signal. As explained with reference to FIG. 2, however, a large part of the noise is actually left.

After studying the noise left, the inventors of the present invention have found the following facts:

A noise of 30 mV is left and directly provided outside, contrary to the conventional knowledge that parasitic capacitive noise of the pixel read transistor 22 can be canceled and zeroed in opposite phases when the switching transistor 25 is turned ON and OFF in the same scan. Since this noise is produced by the pixel read transistor 22 and sent out with a pixel signal, it cannot be temporally separated from the signal and canceled in the CDS circuit.

The CDS circuit 26 of the conventional image sensor also removes thermal noise of the precharge transistor 21 together with noise caused by the parasitic capacitance of the transistor 21 and noise caused by the characteristic fluctuation of the pixel amplification transistor 24. The inventors of the present invention have found that, even before this noise removal, the magnitude of the thermal noise is considerably smaller than expected.

To remove the 30 mV FPN, noise of the pixel read transistor 22 must be removed. In this regard, it is important that the thermal noise of the precharge transistor 21 is so small that it is not necessary to be canceled. Since the pixel read transistor 22 is originally disposed to extract and send the thermal noise of the precharge transistor 21 to the CDS circuit 26, the pixel read transistor 22 can be omitted, if the thermal noise of the precharge transistor 21 is not required to be canceled. Consequently, the image sensor of the invention employs no pixel read transistor 22.

Since the present invention does not employ the pixel read transistors 22 of the conventional image sensor, the invention must entirely change its timing of reading signals through a read line from that of the conventional image sensor. More precisely, the invention sequentially turns ON the precharge switching elements of the respective pixels one after another. With the corresponding pixel switching element being ON, the circuit samples and holds an image signal involving noise in advance, and subtracts the noise from the signal later.

At this time, the noise to be subtracted is that for the next reading operation. This sort of inverse timing of noise cancellation, however, causes no problem because the noise of the precharge transistor 21 (Tr1 in the present invention) can be ignored, i.e., the FPN of every pixel is uniform for each scan resulting in no change in the fluctuations and parasitic capacitive noise of the transistors. This sort of read timing technique is called Switch-Less Reading (SLR).

Now, an image sensor according to an embodiment of the present invention will be explained with reference to the drawings.

Figure 3:
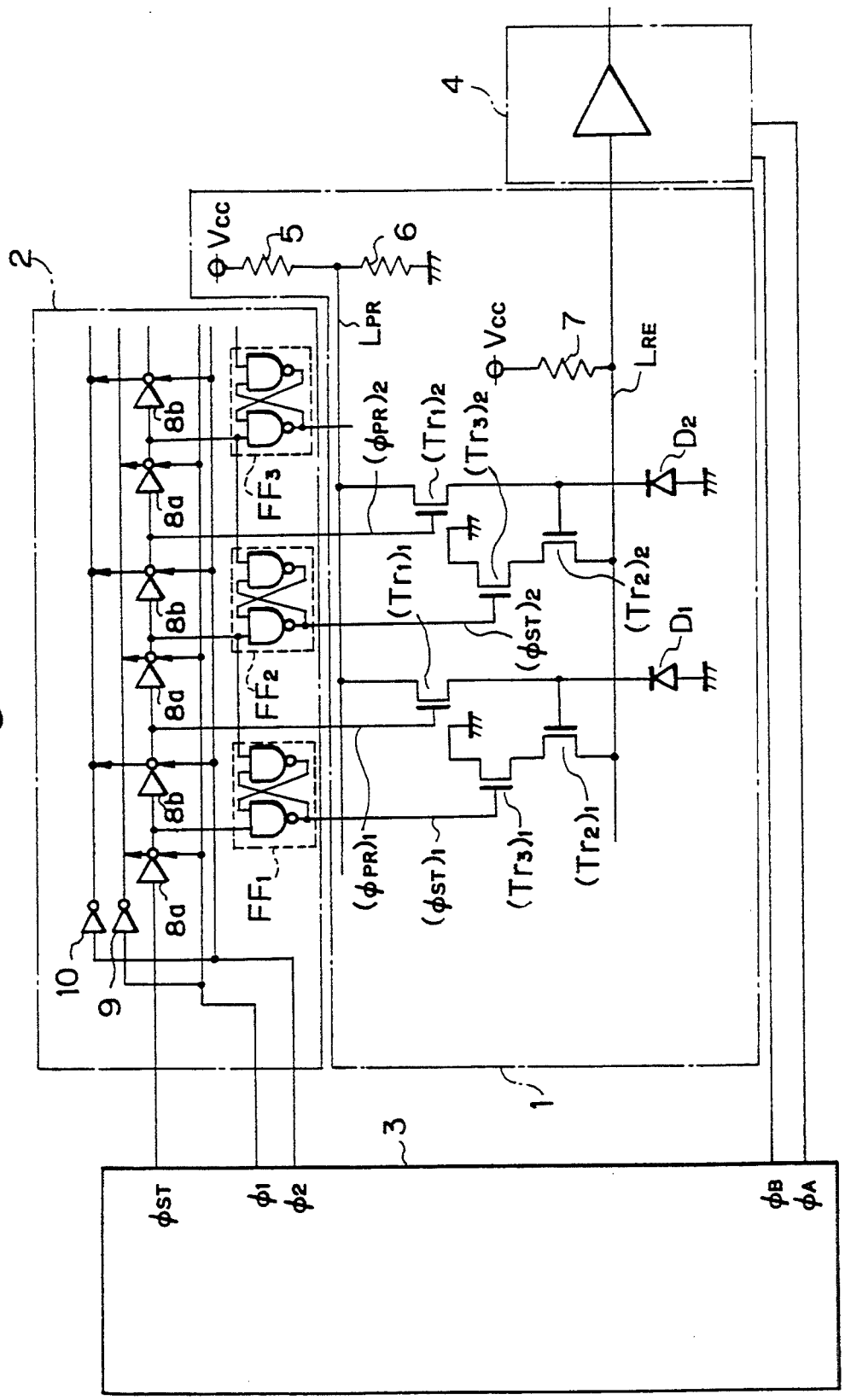
FIG. 3 is a view showing an image sensor according to an embodiment of the present invention.

In FIG. 3, the image sensor of the present invention comprises a pixel unit 1, a shift register 2, a timing signal generator 3, and a signal processor 4.

The pixel unit 1 has a precharge line $L_{PR}$ and a signal read line $L_{RE}$. A predetermined voltage of, for example, 2.5 V divided by resistors 5 and 6 is applied to the precharge line $L_{PR}$. A power source voltage Vcc is applied to the signal read line $L_{RE}$ through a resistor 7. The signal read line $L_{RE}$ is connected to the signal processor 4.

The pixel unit 1 has a plurality of pixels. Each of the pixels involves a photodiode $D_1$ ($D_2$, ...) serving as a photodetector, a transistor $(Tr1)_1$ $((Tr1)_2, ...)$ serving as a precharge switching element, a transistor $(Tr2)_1$ $((Tr2)_2, ...)$ serving as an amplification element, and a transistor $(Tr3)_1$ $((Tr3)_2, ...)$ serving as a pixel switching element. For each pixel, the precharge transistor $(Tr1)_1$ $((Tr1)_2, ...)$ and photodiode $D_1$ ($D_2$, ...) are connected in series to the precharge line $L_{PR}$. Also, for each pixel, the pixel amplification transistor $(Tr2)_1$ $((Tr2)_2, ...)$ and pixel switching transistor $(Tr3)_1$ $((Tr3)_2, ...)$ are connected in series to the signal read line $L_{RE}$. The gate of the pixel amplification transistor $(Tr2)_1$ $((Tr2)_2, ...)$ is connected to a node between the precharge transistor $(Tr1)_1$ $((Tr1)_2, ...)$ and the photodiode $D_1$ ($D_2$, ...). The other terminal of the pixel switching transistor $(Tr3)_1$ $((Tr3)_2, ...)$ is grounded, and the gate thereof is connected to an output of a flip-flop FF$_1$ (FF$_2$, ... ) of the shift register 2. The flip-flop controls the transistor (Tr3)$_1$ ((Tr3)$_2$, ... ).

In this embodiment, the transistors (Tr1)$_1$ ((Tr1)$_2$, ... ), (Tr2)$_1$ ((Tr2)$_2$, ... ), and (Tr3)$_1$ ((Tr3)$_2$, ... ) are n-channel MOSFETs.

The timing signal generator 3 has signal output ports for providing a start signal $\phi_{ST}$, a pixel ON timing signal $\phi_1$, a precharge timing signal $\phi_2$, a first sampling signal $\phi_A$ for related double sampling, and a second sampling signal $\phi_B$ for related double sampling, respectively.

The shift register 2 includes, for each pixel, a pair of transparent latch circuits 8$a$ and 8$b$ connected in series to the start signal output port of the timing signal generator 3. In the shift register 2, a signal line for the pixel ON timing signal $\phi_1$ from the timing signal generator 3 is divided into two branch lines. An inverter 9 is connected to one of the branch lines. The branch lines are connected to the transparent latch circuits 8$a$. Also, in the shift register 2, a signal line for the precharge timing signal $\phi_2$ from the timing signal generator 3 is divided into two branch lines. An inverter 10 is connected to one of the branch lines. The branch lines are connected to the transparent latch circuits 8$b$.

The gate of the precharge transistor (Tr1)$_1$ ((Tr1)$_2$, ... ) is connected to an output terminal of the corresponding transparent latch circuit 8$b$. The flip-flop FF$_1$ (FF$_2$, ... ) is connected to an output terminal of the corresponding transparent latch circuit 8$a$. The gate of the pixel switching transistor (Tr3)$_1$ ((Tr3)$_2$, ... ) of the pixel unit 1 is connected to an output terminal of the corresponding flip-flop FF$_1$ (FF$_2$, ... ). A reset terminal of the flip-flop FF$_1$ (FF$_2$, ... ) is connected to an input terminal of the adjacent flip-flop FF$_2$ (FF$_3$, ... ).

Figure 4:
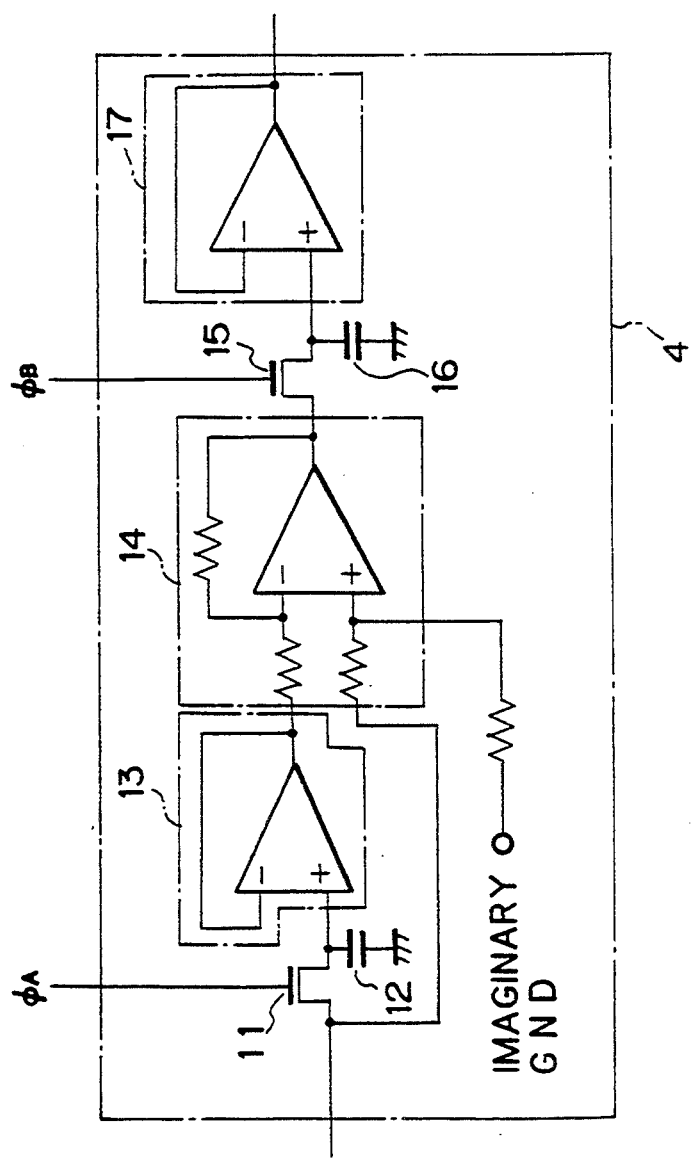
FIG. 4 is a circuit diagram showing a signal processor of the image sensor of FIG. 3.

The signal processor 4 includes a correlated double sampling (CDS) circuit. As shown in FIG. 4, the CDS circuit comprises a transistor 11, a capacitor 12, a buffer 13, a differential amplifier 14, a transistor 15, a capacitor 16, and a buffer 17. The gate of the transistor 11 is connected to a signal line for the first sampling signal $\phi_A$ from the timing signal generator 3. The gate of the transistor 15 is connected to a signal line for the second sampling signal $\phi_B$ from the timing signal generator 3.

In this embodiment, the pixel unit 1, shift register 2, timing signal generator 3, and signal processor 4 are formed on a single chip. It is possible to form the pixel unit 1 and shift register 2 on a chip, and the timing signal generator 3 and signal processor (correlated double sampling circuit) 4 externally connected to the chip.

Figure 5:
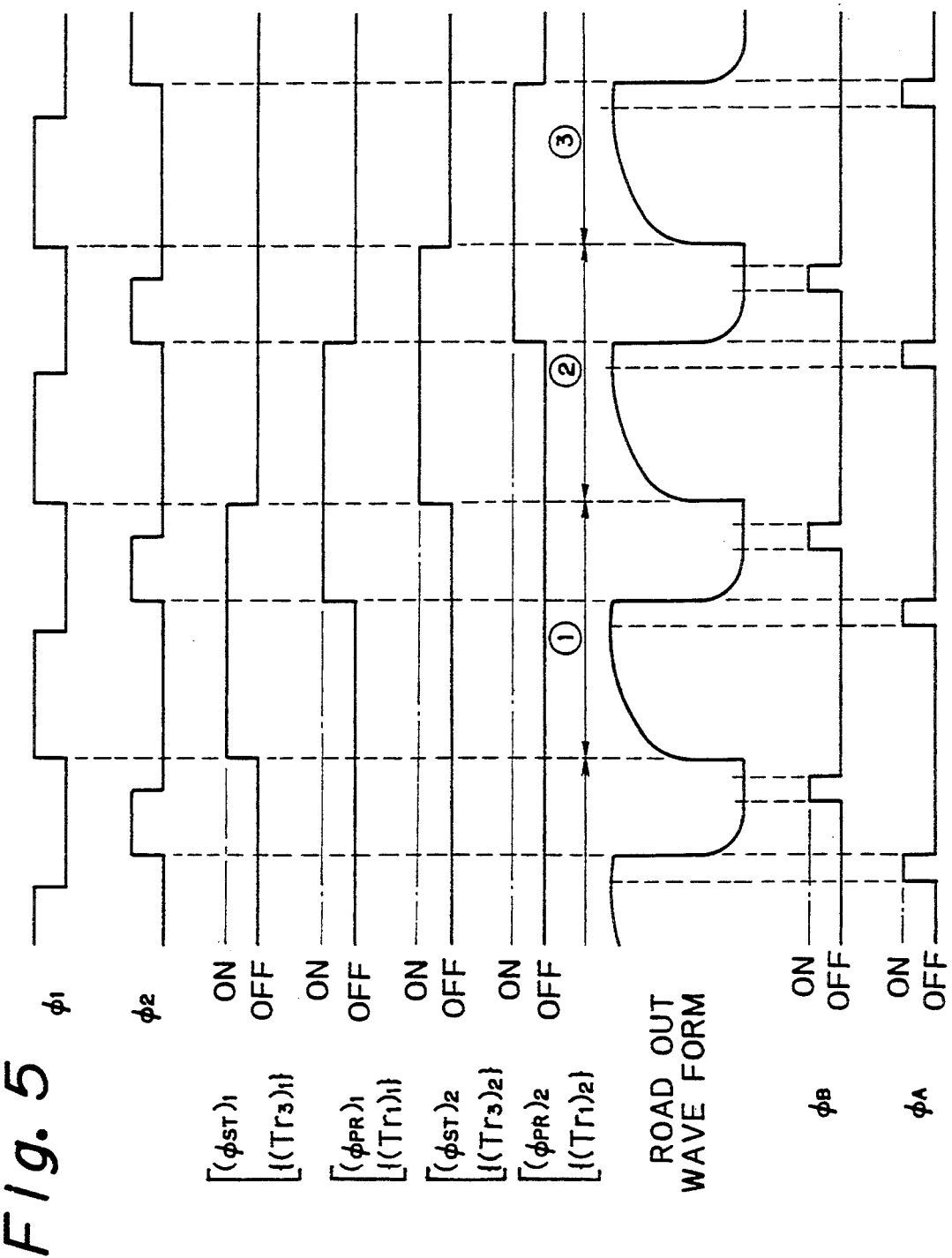
FIG. 5 is a timing chart showing various signals in the image sensor of FIG. 3.

Operation of the image sensor with the above arrangement will be explained. FIG. 5 is a timing chart showing various signals in the image sensor.

The timing signal generator 3 provides the start signal $\phi_{ST}$, pixel ON timing signal $\phi_1$, and precharge timing signal $\phi_2$ at given intervals. According to the signals ($\phi_{ST}$)$_1$, ($\phi_{ST}$)$_2$, ... , the pixel switching transistors (Tr3)$_1$, (Tr3)$_2$, ... of the pixels are successively turned ON, so that the pixels are sequentially read one after another.

When the pixel switching transistor (Tr3)$_1$ ((Tr3)$_2$, ... ) is turned ON in a pixel to be read, the pixel amplification transistor (Tr2)$_1$ ((Tr2)$_2$, ... ) carries out impedance conversion on a signal from the photodiode D$_1$ (D$_2$, ... ) and provides the converted signal to the signal read line L$_{RE}$.

During the latter part of a period (corresponding to one of the periods (1), (2), and (3) of FIG. 5) in which the pixel switching transistor (Tr3)$_1$ ((Tr3)$_2$, ... ) is ON, the precharge transistor (Tr1)$_1$ ((Tr1)$_2$, ... ) is turned ON in response to the precharge timing signal $\phi_2$, and the photodiode D$_1$ (D$_2$, ... ) is charged and initialized. Thereafter, the charges of the photodiode D$_I$ (D$_2$, ... ) are reduced depending on a photoelectric current that is dependent on the intensity of light the photodiode received.

In the signal processor 4, the transistor 11 is turned ON according to the first sampling signal $\phi_A$ with the precharge transistor (Tr1)$_1$ ((Tr1)$_2$, ... ) being OFF, and at the same time, charges from the signal read line L$_{RE}$ are stored in the capacitor 12. The differential amplifier 14 compares the voltage of the capacitor 12 with the voltage of a signal that is obtained on the signal read line L$_{RE}$ when the precharge transistor (Tr1)$_1$ ((Tr1)$_2$, ... ) is turned ON, and finds a difference between them. The difference is provided to the outside when the transistor 15 is turned ON in response to the second sampling signal As mentioned above, the image sensor according to this embodiment comprises the photodiodes D$_1$, D$_2$, ... arranged for the pixels, respectively, the photodiodes being connected, through the respective precharge transistors (Tr1)$_1$, (Tr1)$_2$, ... , to the precharge line L$_{PR}$ to which a predetermined voltage is applied, the pixel amplification transistors (Tr2)$_1$, (Tr2)$_2$, ... arranged for the pixels, respectively, one end of the pixel amplification transistors being connected to the signal read line L$_{RE}$, the other end to the respective pixel switching transistors (Tr3)$_1$, (Tr3)$_2$, ... , and the gates to the respective nodes between the precharge transistors (Tr1)$_1$, (Tr1)$_2$, ... and the photodiodes D$_1$, D$_2$, ... , the timing signal generator 3 for sequentially turning ON the precharge transistors (Tr1)$_1$, (Tr1)$_2$, ... of the respective pixels one after another with the corresponding pixel switching transistors (Tr3)$_1$, (Tr3)$_2$, ... being closed (ON), and the correlated double sampling circuit 4 for providing a difference between a value read out of the signal read line L$_{RE}$ with the precharge transistor (Tr1)$_1$ ((Tr1)$_2$, ... ) being ON according to the timing signal generator 3 and a value read out of the signal read line L$_{RE}$ with the precharge transistor (Tr1)$_1$ ((Tr1)$_2$, ... ) being OFF.

Unlike the conventional image sensor of FIG. 1 which is theoretically incapable of canceling the FPN caused by the pixel read transistors 22 because the timing of generation of the noise is the same as that of an output signal, the present invention does not use the pixel read transistors 22, thereby reducing the noise caused by the pixel read transistors. As a result, the invention achieves an S/N ratio of 256 with an output amplitude of 1280 mV, i.e., a noise of 5 mV.

The operating sequence of the image sensor of the invention will be explained with reference to FIG. 5.

The operating sequence comprises a first step of providing a pixel ON timing signal from a timing signal generator at given intervals, a second step of activating a first pixel switching element according to the first step, carrying out impedance conversion by an amplification element on signal data provided by a photodetector, and providing the converted signal data to a signal read line, a third step of providing a first sampling signal used for sampling data from the signal read line in the middle of the second step, a fourth step of storing data from the signal read line in a first memory according to the first sampling signal, a fifth step of providing a precharge timing signal from the timing signal generator in the middle of the second step, a sixth step of activating a precharge switching element according to the fifth step and initializing the photodetector, a seventh step of providing a second sampling signal used for sampling data from the signal read line in the middle of the second step during the operation of the precharge switching element, an eighth step of storing data from the signal read line in a second memory according to the second sampling signal, a ninth step of providing a difference between the two pieces of data stored in the first and second memories, and a tenth step of deactivating the first pixel switching element, activating a second pixel switching element according to the next pixel ON timing signal, and repeating the above steps.

As explained above in detail, the present invention remarkably reduces fixed pattern noise (FPN) caused by operations of transistors used for reading pixel signals.

We claim:

1. An image sensor comprising:
 a photodetector disposed for each of a plurality of pixels;
 a precharge line to which a predetermined voltage is applied;
 a signal read line;
 a precharge switching element for each of the pixels, each said precharge switching element having one end connected to the precharge line and another end directly connected to the photodetector without any switching element between said precharge switching element and said photodetector, to carry out a switching operation in response to a first control signal;
 an amplification element disposed for each of the pixels, each said amplification element connected to the signal read line as well as to a node between the photodetector and the precharge switching element;
 a pixel switching element disposed for each of the pixels, each said pixel switching element connected to the amplification element, to carry out a switching operation on the amplification element in response to a second control signal provided by the shift register;
 a timing signal generator producing said first control signal and said second control signal to control said precharge switching element and said pixel switching element both being provided for each one of the pixels, respectively, through said shift register, so that said precharge switching element is turned only from its OFF condition to its ON condition during a time while said pixel switching element is turned ON; and
 a signal processor including a correlated double sampling circuit connected to the signal read line, for detecting and providing a difference between different output values provided to the signal read line at different timings.

2. An image sensor comprising:
 a photodetector for each of a plurality of pixels,
 a precharge switching element directly connected to said photodetector without any switching elements between said precharge switching element and said photodetector, and said precharge switching element directly connected to a precharge line, without any switching elements between said precharge switching element and said photodetector, a predetermined voltage applied to said precharge line;
 a pixel switching element;
 an amplification element for each pixel, one end of the amplification element being connected to a signal read line, the other end thereof being grounded through said pixel switching element, and the gate thereof being connected to a node between the precharge switching element and the photodetector;
 a timing signal generator for sequentially turning ON the precharge switching elements one after another while a corresponding pixel switching element is already ON; and
 a correlated double sampling circuit for providing a difference between a value read out of the signal read line with the precharge switching element being ON according to the timing signal generator and a value read out of the signal line with the precharge switching element being OFF.

3. An image sensor according to claim 2, wherein the correlated double sampling circuit includes a circuit for sampling and holding a signal including noise from the signal read line with the precharge switching element being OFF, sampling and holding a signal formed of only the noise from the signal read line with the precharge switching element being ON, and Subtracting the noise only signal from the noise including signal.

4. A method of operating an image sensor comprising:
 a first step of providing a pixel ON timing signal from a timing signal generator at given intervals;
 a second step of activating a first pixel switching element according to the first step, carrying out impedance conversion by an amplification element on signal data provided by a photodetector, and providing the converted signal data to a signal read line;
 a third step of providing a first sampling signal used for sampling data from the signal read line in the middle of the second step;
 a fourth step of storing data from the signal read line in a first memory according to the first sampling signal;
 a fifth step of providing a precharge timing signal from the timing signal generator in the middle of the second step;
 a sixth step of activating a precharge switching element according to the fifth step and initializing the photodetector;
 a seventh step of providing a second sampling signal used for sampling data from the signal read line in the middle of the second step during the operation of the precharge switching element;
 an eighth step of storing data from the signal read line in a second memory according to the second sampling signal;
 a ninth step of providing a difference between the two pieces of data stored in the first and second memories; and
 a tenth step of deactivating the first pixel switching element, activating a second pixel switching element according to the next pixel ON timing signal, and repeating the above steps.

5. An image sensor comprising:
 a photodetector for each of a plurality of pixels,
 a precharge switching element directly connected to said photodetector and to a precharge line to which a predetermined voltage is applied, without any switching element between said precharge switching element and said photodetector, a pixel switching element;

an amplification transistor disposed for each pixel, being connected to a signal read line and being grounded through said pixel switching element, and the gate thereof being connected to a node between the precharge switching element and the photodetector;

a timing signal generator for sequentially turning ON the precharge switching elements one after another while the corresponding pixel switching element is already ON; and a correlated double sampling circuit for providing a difference between a value read out of the signal read line with the precharge switching element being ON according to the timing signal generator and a value read out of the signal line with the precharge switching element being OFF.

6. An image sensor including a pixel unit for a plurality of pixels which comprises:

a shift register;

a photodetector disposed for each of the pixels;

a precharge line to which a predetermined voltage is applied;

a signal read line;

a precharge switching element for each of the pixels, having one end connected to the precharge line and another end directly connected to the photodetector;

an amplification element disposed for each of the pixels, connected to the signal read line and connected to a node between the photodetector and the precharge switching element;

a pixel switching element disposed for each of the pixels, connected to the amplification element, to carry out a switching operation on the amplification element in response to a control signal provided by the shift register; and a timing signal generator producing a timing signal to control, through said shift register, said precharge switching element provided to each one of the pixels to turn only from OFF condition to ON condition only during a time while said pixel switching element is turned ON.

7. An image sensor according to claim 6, wherein said sensor further comprises a signal processor including a correlated double sampling circuit connected to the signal read line, for detecting and providing a difference between different output values provided to the signal read line at different timings.

8. An image sensor comprising:

a photodetector for each of a plurality of pixels;

a shift register;

a precharge line to which a predetermined voltage is applied;

a signal read line;

a precharge switching element for each of the pixels, having one end connected to the precharge line and another end directly connected to the photodetector;

an amplification element disposed for each of the pixels, connected to the signal read line and connected to a node between the photodetector and the precharge switching element;

a pixel switching element disposed for each of the pixels, connected to the amplification element, to carry out a switching operation on the amplification element in response to a control signal provided by the shift register;

a timing signal generator producing a timing signal to control said precharge switching element for each of the pixels, through said shift register, so as to control said precharge switching element to turn ON, and to turn OFF, while said pixel switching element is turned ON; and a signal processor circuit for providing a difference between a value read out of the signal read line while the precharge switching element is controlled by the timing signal generator to be ON and a value read out of the signal line while the precharge switching element is controlled to be OFF.

9. An image sensor comprising:

a photodetector for each of a plurality of pixels;

a shift register;

a precharge line to which a predetermined voltage is applied;

a signal read line;

a precharge switching element for each of the pixels, each having one end connected to the precharge line and another end directly connected to a photodetector associated with each pixel;

an amplification element disposed for each of the pixels, connected to the signal read line and connected to a node between the photodetector and the precharge switching element;

a pixel switching element disposed for each of the pixels, connected to the amplification element, to carry out a switching operation on the amplification element in response to a control signal provided by the shift register;

a timing signal generator producing a timing signal to control said precharge switching element, provided to each one of the pixels, through said shift register, whereby when said timing signal is generated, said node portion formed between said photodetector and said precharge switching element is selectively set at one of two conditions, in a first condition which said node portion is connected to said precharge line through said precharge switching element and in a second condition in which said node portion is not connected to said precharge switching line, both said first and said second conditions occurring during a time while the pixel switch is turned ON; and a signal processor circuit for detecting a difference between a signal value read out from the signal read line when said node portion is connected to said precharge line and a signal value read out from the signal read line when said node portion is not connected to said precharge line.

* * * * *